(12) United States Patent
Kim (10) Patent No.: US 12,026,814 B2
(45) Date of Patent: Jul. 2, 2024

(54) METHOD AND DEVICE FOR GENERATING VIRTUAL FACE BY USING ARTIFICIAL INTELLIGENCE

(71) Applicant: SRUNIVERSE CO., LTD., Seoul (KR)

(72) Inventor: Han Bin Kim, Seoul (KR)

(73) Assignee: SRUNIVERSE CO., LTD., Seoul (KR)

(*) Notice: Subject to any disclaimer, the term of this patent is extended or adjusted under 35 U.S.C. 154(b) by 0 days.

(21) Appl. No.: 17/796,875

(22) PCT Filed: Nov. 15, 2021

(86) PCT No.: PCT/KR2021/016658
§ 371 (c)(1),
(2) Date: Aug. 1, 2022

(87) PCT Pub. No.: WO2022/108275
PCT Pub. Date: May 27, 2022

(65) Prior Publication Data
US 2023/0343006 A1    Oct. 26, 2023

(30) Foreign Application Priority Data
Nov. 18, 2020    (KR) .................. 10-2020-0154369

(51) Int. Cl.
*G06T 11/60*    (2006.01)
*G06N 3/0455*    (2023.01)
(Continued)

(52) U.S. Cl.
CPC ............ *G06T 11/60* (2013.01); *G06N 3/0455* (2023.01); *G06N 3/08* (2013.01); *G06T 9/002* (2013.01)

(58) Field of Classification Search
None
See application file for complete search history.

(56) References Cited

U.S. PATENT DOCUMENTS

2020/0110925 A1    4/2020   Wang et al.
2020/0320341 A1*   10/2020  Khurana ................. G06V 40/16
2021/0049468 A1*   2/2021   Karras .................. G06V 40/168

FOREIGN PATENT DOCUMENTS

JP    2020-526809 A    8/2020
KR    10-2012-0130627 A   12/2012
(Continued)

OTHER PUBLICATIONS

Zhao et al., "Stylized Adversarial AutoEncoder for Image Generation", Oct. 23-27, 2017, Proceedings of the 25th ACM International Conference on Multimedia, pp. 244-251 (Year: 2017).*

(Continued)

*Primary Examiner* — Kent W Chang
*Assistant Examiner* — Jonathan M Cofino (57) ABSTRACT

Provided are a method and a device for generating a virtual face, the method including: performing, by a device for generating the virtual face, comparison and learning on an inferred face and an existent face through deep learning after receiving a plurality of pieces of face source data and at least one piece of face background data; and generating, after receiving one piece of face background data, virtual face data by combining the face inferred from the plurality of pieces of face source data with a feature of the one piece of face background data through a model generated by comparison and learning.

8 Claims, 5 Drawing Sheets

(51) Int. Cl.
*G06N 3/08* (2023.01)
*G06T 9/00* (2006.01)

(56) References Cited

FOREIGN PATENT DOCUMENTS

KR 10-2017-0050465 A 5/2017
KR 10-2020-0101206 A 8/2020

OTHER PUBLICATIONS

International Search Report and Written Opinion dated Feb. 15, 2022 from International Patent Application No. PCT/KR2021/016658 filed Nov. 15, 2021.
KR 10-2020-0154369 1st office action dated Oct. 6, 2021.

* cited by examiner

METHOD AND DEVICE FOR GENERATING VIRTUAL FACE BY USING ARTIFICIAL INTELLIGENCE

CROSS REFERENCE TO RELATED APPLICATION

This application is a 371 National Stage application of International Application No. PCT/KR2021/016658 tiled on Nov. 15, 2021, which claims priority of Korea Patent (KR) application Serial Number 10-2020-0154369 filed on Nov. 18, 2020, all of which are incorporated herein by reference in their entireties.

TECHNICAL FIELD

Embodiments of the present disclosure relate to a method and a device for generating a virtual face by using artificial intelligence in order to consistently generate a virtual person who does not exist in the world by using an artificial intelligence technology.

BACKGROUND ART

A face creation technology using artificial intelligence has been developed to such a high level that the technology can create high-resolution realistic faces. A face synthesis technology, which is used in various contents recently, gives people an opportunity to provide various contents, but there are many cases of abuse that a technology for synthesizing a particular person's face is used for pornography, fake news, etc. In addition, even if a particular person's face is synthesized to good purpose without abuse, there is a high risk of causing a problem with the particular persons portrait rights. Therefore, a technology for synthesizing a person who really exists is risky.

The above-described information about the related art has been retained by the inventors for the purpose of developing the present disclosure or was obtained during the process of developing the present disclosure. It should be appreciated that this information did not necessarily belong to the public domain before the patent filing date of the present disclosure.

DISCLOSURE

Technical Problem

According to an embodiment of the present disclosure, there is provided a method and a device for generating a virtual face by using artificial intelligence in order to consistently generate a virtual person who does not exist in the world by using an artificial intelligence technology.

According to another embodiment of the present disclosure, there are provided a method and a device for generating a virtual face by using artificial intelligence in order to consistently generate a virtual person who does not exist in the world by using an autoencoder technology of deep learning, which is a field of artificial intelligence.

Technical Solution

According to an aspect of the present disclosure, there is provided a method of generating a virtual face, the method including: performing, by a device for generating the virtual face, comparison and learning on an inferred face and an existent face through deep learning after receiving a plurality of pieces of face source data and at least one piece of face background data; and generating, after receiving one piece of face background data, virtual face data by combining the face inferred from the plurality of pieces of face source data and a feature of the one piece of face background data through a model generated by comparison and learning.

In addition, the performing of comparison and learning may include: receiving, by an encoder of the device for generating the virtual face, and encoding the plurality of pieces of face source data and the at least one piece of face background data by using multiple convolution layers; generating, by an internetwork part, a distribution area of each of the source data and the background data by using the encoded data; decoding and reconstructing, by a decoder, pieces of data transmitted from the internetwork part, by using multiple deconvolution layers; and comparing the reconstructed data with raw data and performing learning.

In addition, the generating of the virtual face data may include: receiving and encoding the one piece of face background data by the encoder of the device for generating the virtual face; passing, by the internetwork part, the encoded data through the model generated by comparison and learning, and then deriving the distribution area of the virtual face and transmitting the distribution area to the decoder; and performing, by the decoder, decoding to generate the virtual face data including features of the inferred face and a background face.

In addition, the face background data may include at least one selected from a group of a facial expression, an eye/nose/mouth shape, and eye blinking in a face.

In addition, the face data may be a face image or a face video.

According to another aspect of the present disclosure, there is provided a device for generating a virtual face including: a learning part configured to receive a plurality of pieces of face source data and at least one piece of face background data, and perform comparison and learning on an inferred face and an existent face through deep learning; and an inference part configured to receive one piece of face background data, and generate virtual face data by combining the face inferred from the plurality of pieces of face source data and a feature of the one piece of face background data through a model generated by comparison and learning.

In addition, the learning part may include: an encoder configured to receive and encode the plurality of pieces of face source data and the at least one piece of face background data by using multiple convolution layers; an internetwork part configured to generate a distribution area of each of the source data and the background data by using the encoded data; and a decoder configured to decode pieces of data transmitted from the internetwork part by using multiple deconvolution layers.

In addition, the inference part may include: the encoder configured to receive and encode one piece of face background data; the internetwork part configured to pass the encoded data through the model generated by comparison and learning, and then derive the distribution area of the virtual face and transmit the distribution area to the decoder; and the decoder configured to generate, through decoding, the virtual face data including features of the inferred face and a background face.

In addition, the face background data may include at least one selected from a group of a facial expression, an eye/nose/mouth shape, and eye blinking in a face.

In addition, the face data may be a face image or a face video.

Aspects, features, and advantages other than those described above will be apparent from the following drawings, claims, and detailed description of the present disclosure.

Advantageous Effects

The method and the device for generating a virtual face by using artificial intelligence according to the embodiments of the present disclosure enable a virtual face synthesis technology to be used for various contents without risks, such as a problem with a particular person's portrait rights, an abuse case, etc.

In addition, based on data of people, various virtual people can be generated through combinations of new virtual people that have not been seen before by using the number of cases.

100: device for generating virtual face
110: encoder
120: internetwork part
130: decoder
200: learning part
300: inference part

MODE FOR INVENTION

The present disclosure may be modified in various ways and implemented by various embodiments, so that specific embodiments are shown in the drawings and will be described in detail. Advantages and features of the present disclosure, and methods to achieve them will be apparent from the following embodiments that will be described in detail with reference to the accompanying drawings. It is noted that the present disclosure is not limited to the following embodiments and may be embodied in various forms.

Hereinafter, the embodiments of the present disclosure will be described in detail with reference to the accompanying drawings, wherein the same or corresponding elements are denoted by the same reference numerals, and a redundant description thereof will be omitted.

In the embodiments below, the terms "first", "second", etc. do not have limited meaning, but are used to distinguish one element from another.

In the embodiments below, the singular forms "a", "an", and "the" are intended to include the plural forms as well, unless the context clearly indicates otherwise.

In the embodiments below, the term "including" or "having" is meant to imply the presence of a feature or element described in the specification, does not preclude the possibility that one or more other features or elements may be added.

In the embodiments below, when a part, such as a film, a region, an element, etc. is said to be positioned "on" or "above" another part, it can be directly on the part or be indirectly on the part with an intervening film, region, element, etc. interposed therebetween.

In the drawings, elements may be exaggerated or reduced in size for convenience of description. For example, any size and thickness of each element shown in the drawings are shown for convenience of description, so the present disclosure is not necessarily limited thereto.

The present disclosure relates to a technology for consistently generating a virtual person who does not exist in the world by using an artificial intelligence technology.

Figure 1:
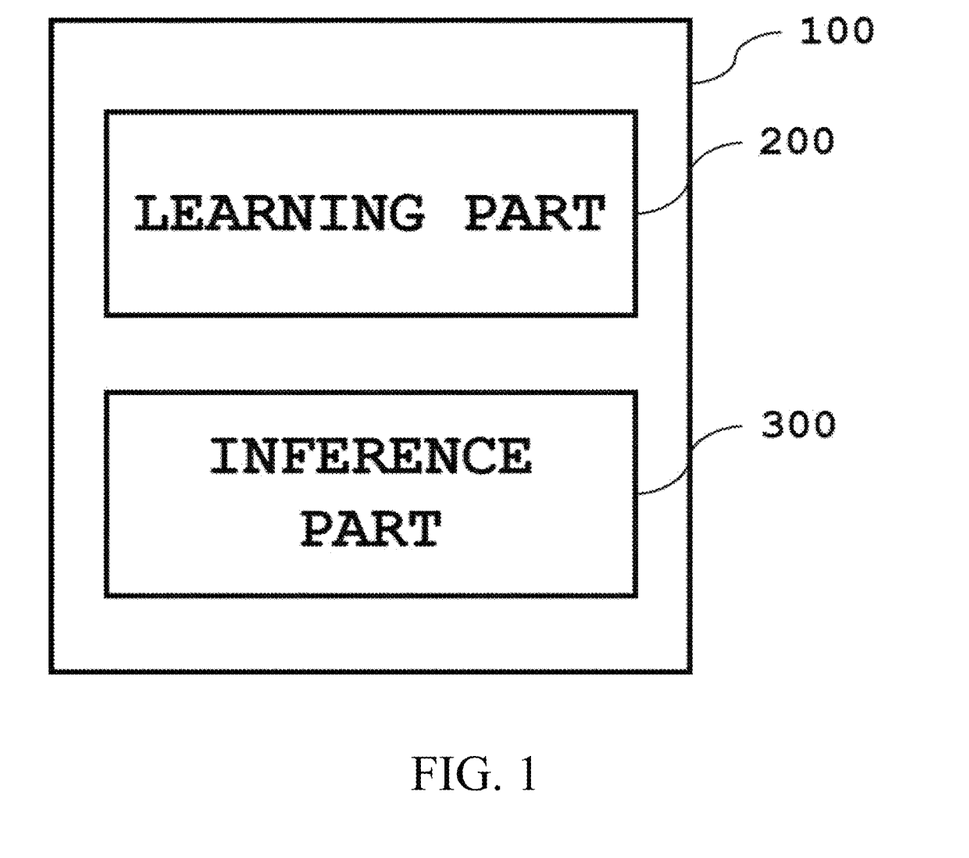
FIG. 1 is a view showing a device for generating a virtual face according to an embodiment of the present disclosure.

FIG. 1 is a view showing a device for generating a virtual face according to an embodiment of the present disclosure.

Referring to FIG. 1, the device 100 for generating the virtual face may include a learning part 200 and an inference part 300.

The learning part 200 may receive a plurality of pieces of face source data and at least one piece of face background (destination) data to perform comparison and learning on an inferred face and an existent face through deep learning. Herein, the plurality of pieces of face source data of people may be used to generate a virtual face, and the at least one piece of face background data may be data containing information on at least one selected from a group of a facial expression, an eye/nose/mouth shape, and eye blinking in a face. That is, the face background data may include information capable of representing various facial shapes and movements of one person, for example, eyes, nose, mouth, eyebrows, etc., and may include facial dynamic feature information of people rather than just one person.

After a virtual face generation model is generated through the learning part 200, the inference part 300 may receive one piece of face background data and generate virtual face data that is obtained by combining the face inferred from a plurality of pieces of face source data with a feature of the one piece of face background data through the virtual face generation model.

The learning part 200 and the inference part 300 may be elements or step-based processes in the device 100 for generating the virtual face, and may share and use elements in the device 100 for generating the virtual face.

In addition, the device 100 for generating the virtual face may consistently generate a virtual person who does not exist in the world, by using an autoencoder technology of deep learning, which is a field of artificial intelligence. The autoencoder learns each layer of a neural network step by step such that a final output is a reproduction of an initial output. The dimensions of input and output layers are the same, but a hidden layer is designed with a lower dimension than the input and output layers. Accordingly, the autoencoder may compress pieces of input data to extract features, and may output data that is obtained by reproducing the input as much as possible on the basis of the extracted features.

In addition, the autoencoder is unable to copy an input as it is as an output because of the hidden layer having the lower dimension, so the autoencoder is required to perform learning so as to output the output the same as the input. This learning enables the autoencoder to learn the most important feature of the input data.

Detailed learning and inference methods of the device 100 for generating the virtual face will be described in detail with reference to FIGS. 2 and 3.

Figure 2:
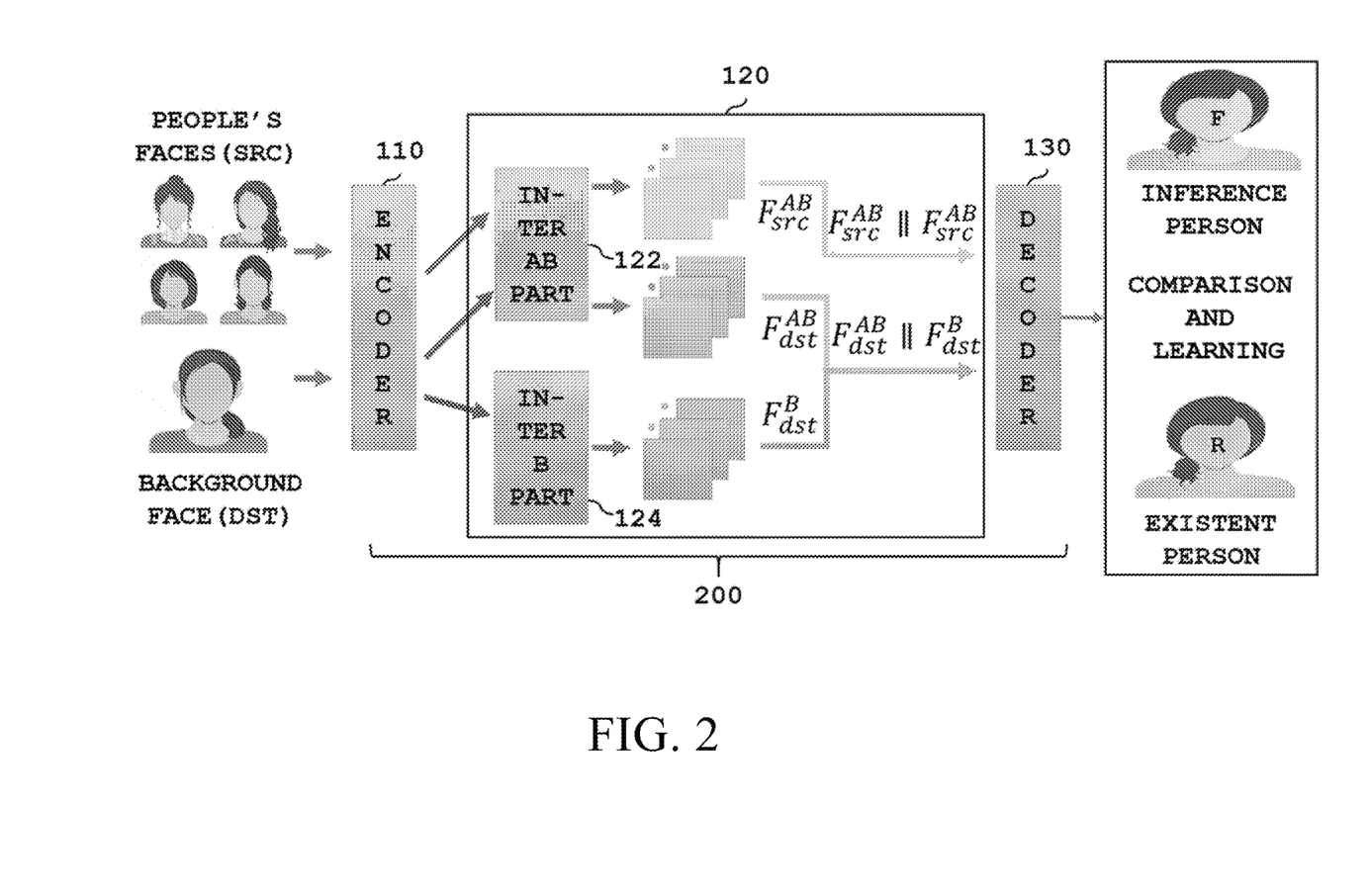
FIG. 2 is a view showing a learning method in a device for generating a virtual face according to an embodiment of the present disclosure.

FIG. 2 is a view showing a learning method in a device for generating a virtual face according to an embodiment of the present disclosure.

Referring to FIG. 2, the learning part 200 of the device 100 for generating the virtual face performs learning on face data, and may include an encoder 110, an internetwork part 120, and a decoder 130. Specifically, the device 100 for generating the virtual face may include the encoder 110 and the decoder 130 having shared weights, and the internetwork part 120 including two independent inter models.

The encoder 110 is composed of multiple convolution layers, and receives a source image and a background image and transmits the images to the internetwork part 120 through an encoding process of compressing the images. In the meantime, the device 100 for generating the virtual face may perform at least one extraction process selected from a group of face detection, face alignment, and face segmentation from an input source image. In addition, also with respect to a background image, the device 100 for generating the virtual face may basically perform alignment on the entire face for matching with the source image.

In the internetwork part 120, passing through networks of an inter-AB part 122 and an inter-B part 124 may occur. The inter-AB part 122 is a network that has learned a source image and a background image once, and the inter-B part 124 is a network that has learned only a background image. In other words, the inter-AB part 122 generates ($F_{src}^{AB} \| F_{src}^{AB}$) features (latent coding) extracted from the source image data and the background image data, and the inter-B part 124 generates ($F_{dst}^{AB} \| F_{dst}^{B}$) a feature extracted only from the background image.

Thus, the internetwork part 120 passes the compressed images through the networks of the inter-AB part 122 and the inter-B part 124 to generate a background image distribution area and a source image distribution area. In addition, the images transmitted from the internetwork part 120 to the decoder 130 composed of multiple deconvolution layers may be reconstructed into the original images through a decoding process. Afterwards, the reconstructed images are compared with the raw images to calculate loss values and the obtained loss values are learned according to a back-propagation technology of deep learning, and thus a virtual face generation model may be generated.

In the meantime, when learning is performed, different weights may be given to parts of a face. For example, more weight may be given to an eye area than to a cheek area in a face to generate a face with more lively eyes.

Figure 3:
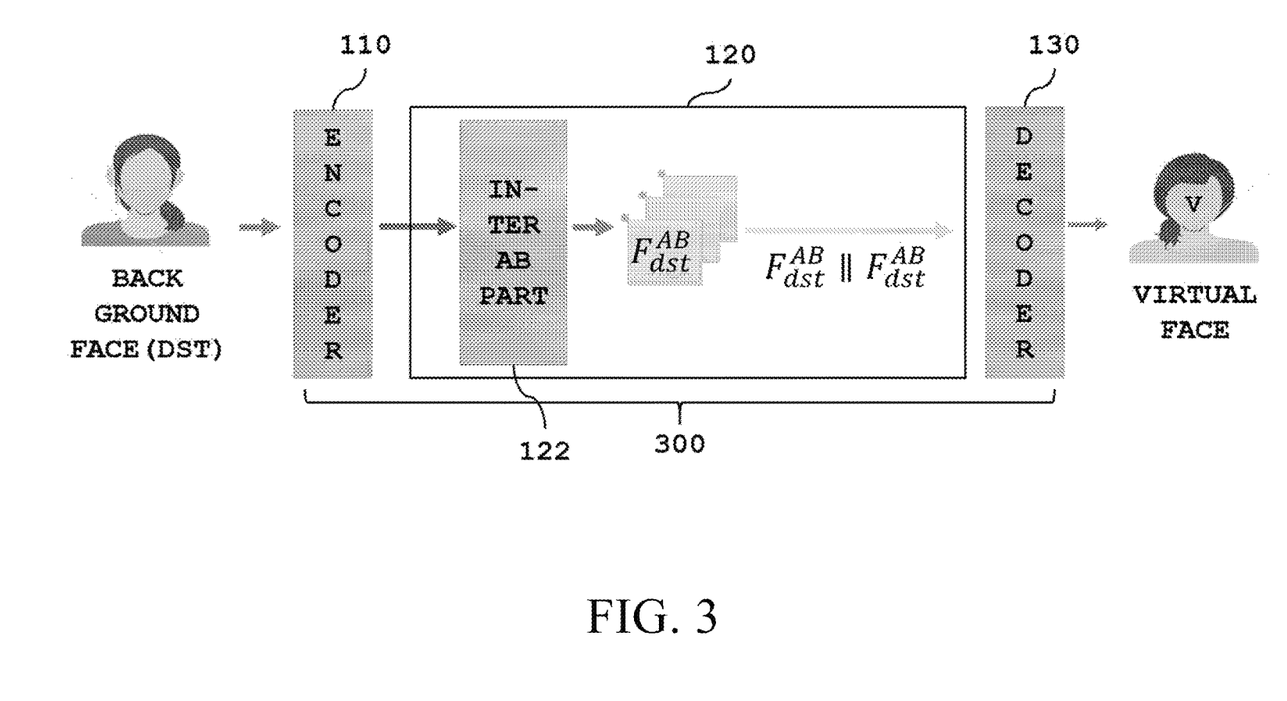
FIG. 3 is a view showing an inference method in a device for generating a virtual face according to an embodiment of the present disclosure.

FIG. 3 is a view showing an inference method in a device for generating a virtual face according to an embodiment of the present disclosure.

Referring to FIG. 3, the inference part 300 of the device 100 for generating the virtual face generates a virtual face including a feature of an input image, and may include the encoder 110, the internetwork part 120, and the decoder 130.

The encoder 110 receives a background image of a face of a particular person, performs an encoding process of compressing the background image, and transmits the compressed image to the internetwork part 120. In the internetwork part 120, passing through only the network of the inter-AB part 122 may occur. Passing through the network of the inter-B part 124 may occur only for learning, and passing through the network of the inter-AB part 122 may occur for inference. Through this, information on a facial expression, a mouth shape, an eye shape, etc. of a face may be obtained. A distribution area of a virtual person generated through source images of several persons may be found from images including the feature information ($F_{dst}^{AB} \| F_{dst}^{AB}$).

In addition, the images transmitted from the internetwork part 120 to the decoder 130 may generate a virtual face image that is a combination of an inferred source face and a feature of the background image through a decoding process of multiple deconvolution layers. The generated image does not have the same face as the source images, and a new virtual person that is a mix of the source images may be generated. In addition, the virtual person with the virtual face may be generated as not a person without a facial expression, but a person imitating the facial expression, the mouth shape, the eye shape, etc. of the background image.

Figure 4:
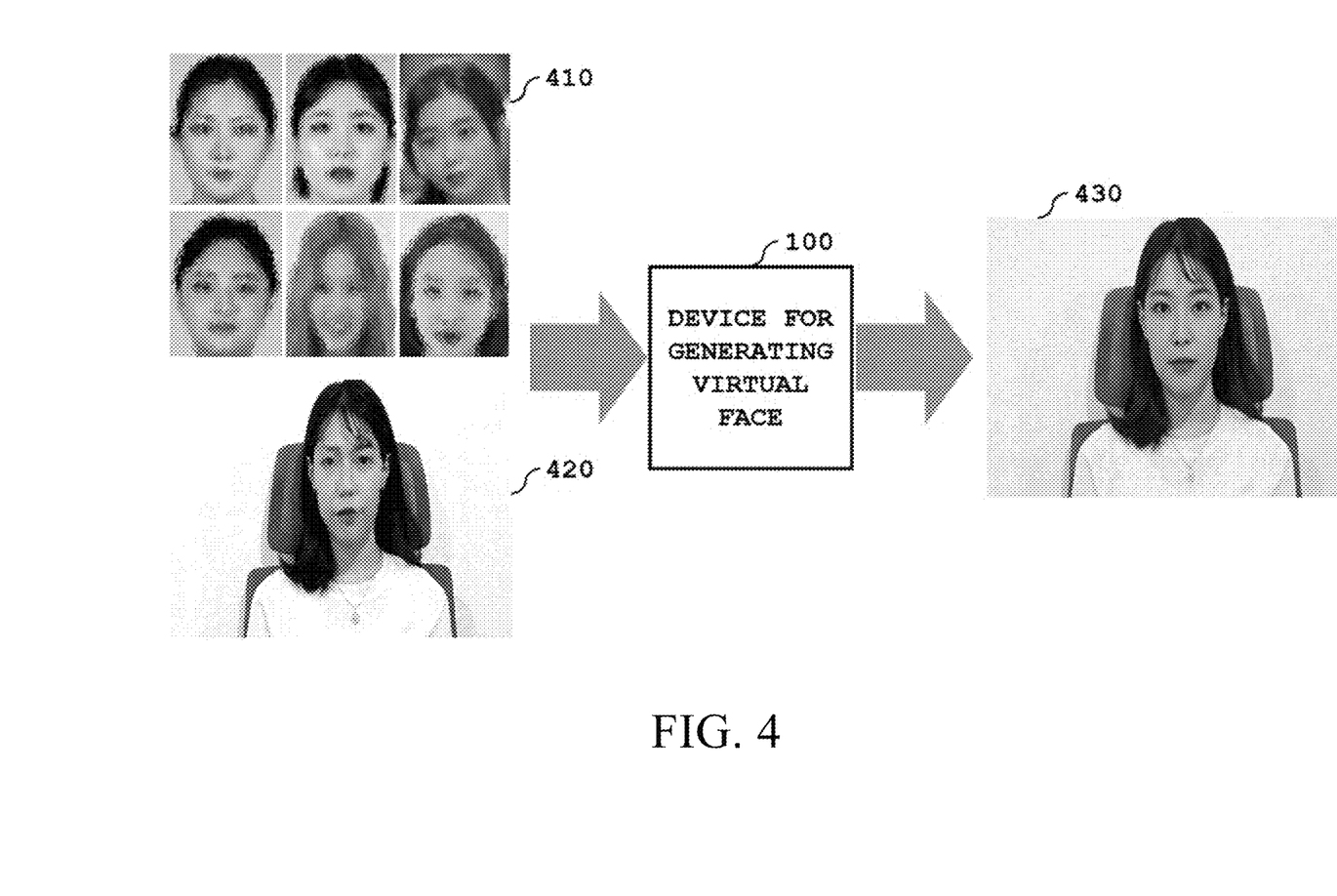
FIG. 4 is a view showing a method of generating a virtual face in a device for generating the virtual face according to an embodiment of the present disclosure.

FIG. 4 is a view showing a method of generating a virtual face in a device for generating the virtual face according to an embodiment of the present disclosure.

Referring to FIG. 4, the learning part 200 of the device 100 for generating the virtual face receives face images 410 of various people to be used for a virtual face as source images, and receives a background face image 420 of at least one person containing information on a facial expression, a mouth shape, eye blinking, etc. as a background image. Then, the device 100 for generating the virtual face generates a model for generating a virtual face through comparison with raw images and learning.

Afterward, when the inference part 300 of the device 100 for generating the virtual face receives a background face image 420 of one person, the device 100 for generating the virtual face outputs a virtual face image 430 that is a combination of the face inferred through the face images 410 of the various people and a feature of the background face image 420 of the one person. In this embodiment, images are used, but video data may be used instead of images.

Figure 5:
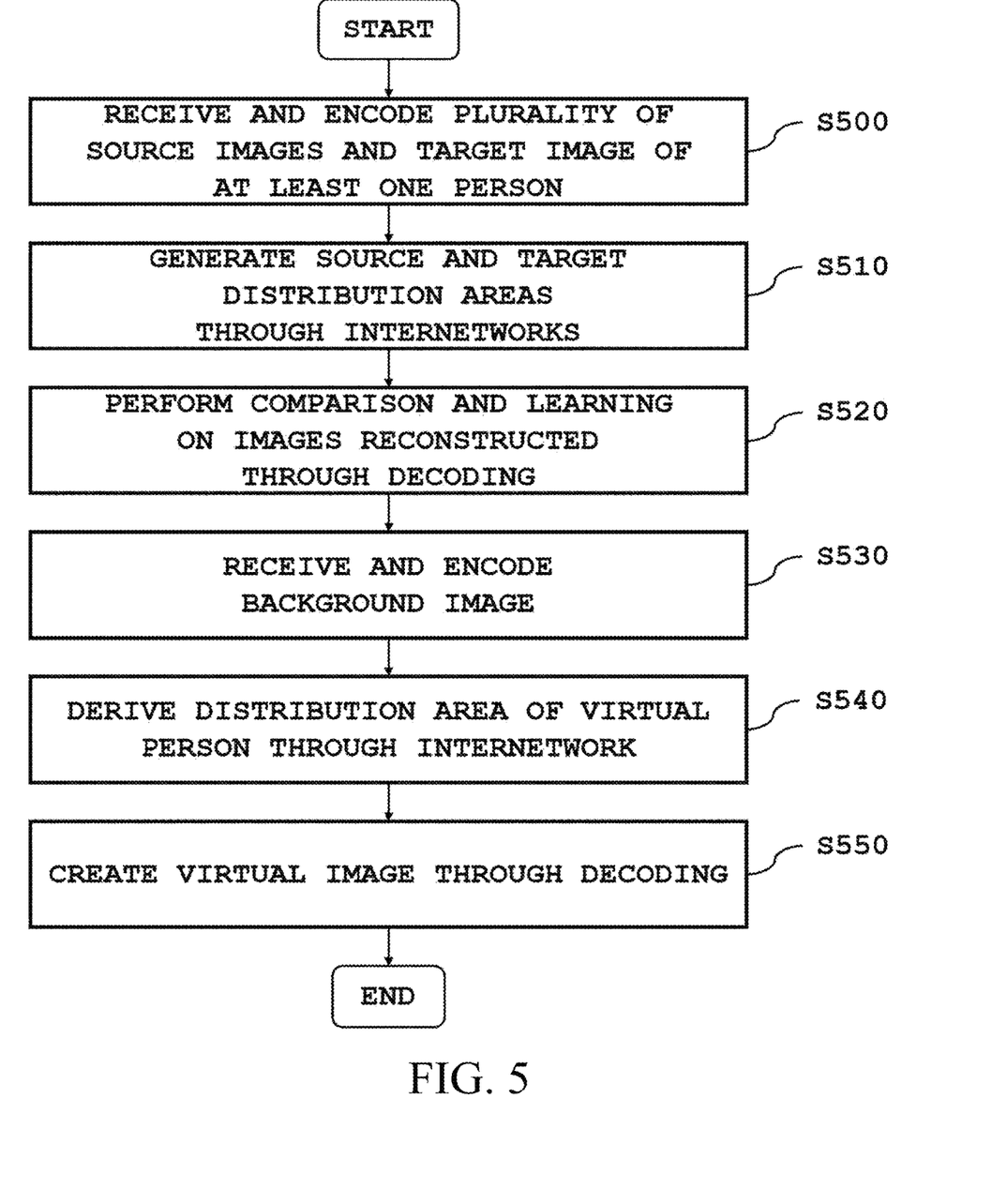
FIG. 5 is a flowchart showing a method of generating a virtual face according to an embodiment of the present disclosure.

FIG. 5 is a flowchart showing a method of generating a virtual face according to an embodiment of the present disclosure.

Referring to FIG. 5, in step S500, the encoder 110 of the device 100 for generating the virtual face receives a plurality of face source images and a background image having facial feature information, encodes the images, and transmits the encoded images to the internetwork part 120.

In step S510, the internetwork part 120 may generate a source image distribution area and a background image distribution area. In step S520, the images are reconstructed through decoding, and the reconstructed images are compared with the raw images to perform learning.

Afterward, in step S530, the encoder 110 of the device 100 for generating the virtual face receives a background image and encodes the same. In step S540, the encoded image passes through the network of the internetwork part 120 that has learned a source image and a background image once.

In step S550, the decoder 130 performs decoding to generate an image of a virtual person's face that is a combination of an inferred source image and a feature of the background image.

That is, a conventional virtual face creation method has a problem that a particular recognizable person's face is output as it is, and it is impossible to generate a new person. Even if a new face is generated, the results are random, and it is thus impossible to consistently use one virtual person.

In a method of generating a virtual face by using artificial intelligence according to an embodiment of the present disclosure, when a device 100 for generating the virtual face trained at any one point in time receives one background face image or video as shown in FIG. 4, the same virtual person can be generated. In addition, a virtual person different from an existent person is generated and the generated face is not limited to a particular person, so that an abuse case targeting a particular person and a problem with a particular person's portrait rights can be solved. In addition, based on data of people, various virtual people can be generated through combinations of new virtual people that have not been seen before by using the number of cases. Accordingly, generation of a virtual person can overcome the problem in the past with generation of a particular celebrity using a face synthesis technology. Therefore, the precedent of the face synthesis technology can be widely used, and is likely used in various contents, such as dramas, movies, news, etc., in the future.

In the meantime, the present disclosure can be embodied as computer-readable code on a computer-readable recording medium. Examples of the computer-readable recording medium include all types of recording devices in which data readable by a computer system is stored. Examples of the computer-readable recording medium includes a ROM, a RAM, a CD-ROM, a magnetic tape, a floppy disk, an optical data storage device, etc.

In addition, the computer-readable recording medium is distributed in a network-connected computer system, and computer-readable code may be stored and executed in a distributed manner. In addition, the functional program, code, and code segments for embodying the present disclosure may be easily inferred by programmers in the art to which the present disclosure pertains.

The steps constituting the method according to the present disclosure may be performed in an appropriate order unless explicitly or otherwise stated. The present disclosure is not necessarily limited to the order in which the steps are described.

All the examples or exemplary terms (e.g., etc.) in the present disclosure are merely used to describe the present disclosure in detail, and the scope of the present disclosure is not limited by the examples or exemplary terms unless limited by the following claims. Furthermore, those skilled in the art will appreciate that many modifications, combinations, and alterations may be made according to design conditions and factors within the scope of the claims or their equivalents.

Therefore, the spirit of the present disclosure shall not be limited to the above-described embodiments, and the entire scope of the appended claims and their equivalents will fall within the scope and spirit of the disclosure.

Although the present disclosure has been described for illustrative purposes with reference to embodiments shown in the drawings, those skilled in the art will appreciate that various modifications and variations of the embodiments made be made therefrom. Accordingly, the true range of protection of the present disclosure should be determined by the technical idea of the following claims.

The invention claimed is:

1. A method of generating a virtual face by using artificial intelligence, the method comprising:
performing, by a device for generating the virtual face, comparison and learning on an inferred face and an existent face through deep learning after receiving a plurality of pieces of face source data and at least one piece of face background data; and
generating, after receiving one piece of face background data, face data of a virtual person who does not exist in the world by combining the face inferred from the plurality of pieces of face source data with a feature of the one piece of face background data through a model generated by comparison and learning,
wherein the generating of the face data of the virtual person comprises:
receiving and encoding the one piece of face background data by an encoder of the device for generating the virtual face;
passing, by an internetwork part of the device for generating the virtual face, the encoded data through the model generated by comparison and learning, and then deriving a distribution area of the virtual face and transmitting the distribution area to a decoder of the device for generating the virtual face; and
performing, by the decoder of the device for generating the virtual face, decoding to generate virtual face data including features of a background face and the face of the virtual person who does not exist in the world inferred from the plurality of pieces of face source data,
wherein the internetwork part includes an inter-AB part and an inter-B part,
wherein the inter-AB part generates features extracted from the plurality of pieces of face source data and the one piece of face background data,
wherein the inter-B part generates a feature extracted from the one piece of face background data,
wherein the one piece of face background data passes through only the inter-AB part for inference and the one piece of face background data passes through the inter-B part only for learning.

2. The method of claim 1, wherein the performing of comparison and learning comprises:
receiving, by the encoder of the device for generating the virtual face, and encoding the plurality of pieces of face source data and the at least one piece of face background data by using multiple convolution layers;
generating, by the internetwork part of the device for generating the virtual face, the distribution area of each of the source data and the background data by using the encoded data;
decoding, by the decoder of the device for generating the virtual face, pieces of data transmitted from the internetwork part, by using multiple deconvolution layers; and
comparing the decoded data with raw data and performing learning.

3. The method of claim 1, wherein the face background data comprises at least one selected from a group of a facial expression, an eye/nose/mouth shape, and eye blinking in a face.

4. The method of claim 1, wherein the face data is a face image or a face video.

5. A device for generating a virtual face by using artificial intelligence, the device comprising:
a learning part configured to receive a plurality of pieces of face source data and at least one piece of face background data, and perform comparison and learning on an inferred face and an existent face through deep learning; and
an inference part configured to receive one piece of face background data, and generate face data of a virtual person who does not exist in the world by combining the face inferred from the plurality of pieces of face source data with a feature of the one piece of face background data through a model generated by comparison and learning, wherein the inference part comprises:

an encoder configured to receive and encode the one piece of face background data;

an internetwork part configured to pass the encoded data through the model generated by comparison and learning, and then derive a distribution area of the virtual face and transmit the distribution area to a decoder; and the decoder configured to generate, through decoding, virtual face data including features of a background face and the face of the virtual person who does not exist in the world inferred from the plurality of pieces of face source data, wherein the internetwork part includes an inter-AB part and an inter-B part, wherein the inter-AB part generates features extracted from the plurality of pieces of face source data and the one piece of face background data, wherein the inter-B part generates a feature extracted from the one piece of face background data, wherein the one piece of face background data passes through only the inter-AB part for inference and the one piece of face background data passes through the inter-B part only for learning.

6. The device of claim 5, wherein the learning part comprises:

the encoder configured to receive and encode the plurality of pieces of face source data and the at least one piece of face background data by using multiple convolution layers;

the internetwork part configured to generate the distribution area of each of the source data and the background data by using the encoded data; and the decoder configured to decode pieces of data transmitted from the internetwork part, by using multiple deconvolution layers.

7. The device of claim 5, wherein the face background data comprises at least one selected from a group of a facial expression, an eye/nose/mouth shape, and eye blinking in a face.

8. The device of claim 5, wherein the face data is a face image or a face video.

* * * * *